US006199450B1

(12) United States Patent
Carlson et al.

(10) Patent No.: US 6,199,450 B1
(45) Date of Patent: Mar. 13, 2001

(54) METHOD AND APPARATUS

(75) Inventors: Douglas A. Carlson, Morton; Danish A. Hussain; Alan L. Stahl, both of Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/466,526

(22) Filed: Dec. 17, 1999

(51) Int. Cl.$^7$ ................................................ F16H 47/00
(52) U.S. Cl. ............................................................ 74/733.1
(58) Field of Search .............................. 74/733.1; 477/61

(56) References Cited

U.S. PATENT DOCUMENTS

| | | |
|---|---|---|
| 3,673,400 | * 6/1972 | Ito ........................................ 74/733.1 |
| 3,752,011 | * 8/1973 | Casey et al. ......................... 74/733.1 |
| 3,765,271 | * 10/1973 | Dach et al. .......................... 74/733.1 |
| 4,480,502 | * 11/1984 | Nembach ............................. 74/733.1 |
| 4,843,916 | 7/1989 | Bouta . |
| 4,977,797 | * 12/1990 | Aoki et al. .......................... 74/733.1 |
| 5,309,790 | * 5/1994 | Tanaka ................................. 74/733.1 |
| 5,454,767 | 10/1995 | Clausen et al. . |
| 5,475,591 | 12/1995 | Suzuki et al. . |
| 5,510,982 | 4/1996 | Ohnishi et al. . |
| 5,588,936 | 12/1996 | Uchida et al. . |
| 5,688,207 | 11/1997 | Uchida et al. . |

* cited by examiner

Primary Examiner—Dirk Wright
(74) Attorney, Agent, or Firm—John W. Morrison

(57) ABSTRACT

A drive line assembly for a work machine is disclosed. The drive line assembly includes an engine driving an engine output shaft and an engine speed sensor which generates engine speed signals indicative of a speed of the engine output shaft. The drive line assembly further includes a torque converter driven by the output shaft which drives a transmission input shaft and a transmission speed sensor which generates transmission speed signals indicative of a speed of the transmission input shaft. The drive line assembly yet further includes a transmission driven by the transmission input shaft and having a first speed clutch, a second speed clutch, and a directional clutch, and a controller. The controller is operable to determine a torque converter ratio from the engine speed signal and the transmission speed signal and determine an engine load based on the torque converter ratio. The controller is further operable to control engagement of the first speed clutch, the second speed clutch and the directional clutch based on the engine load. A method controlling a drive line assembly is also disclosed.

18 Claims, 4 Drawing Sheets

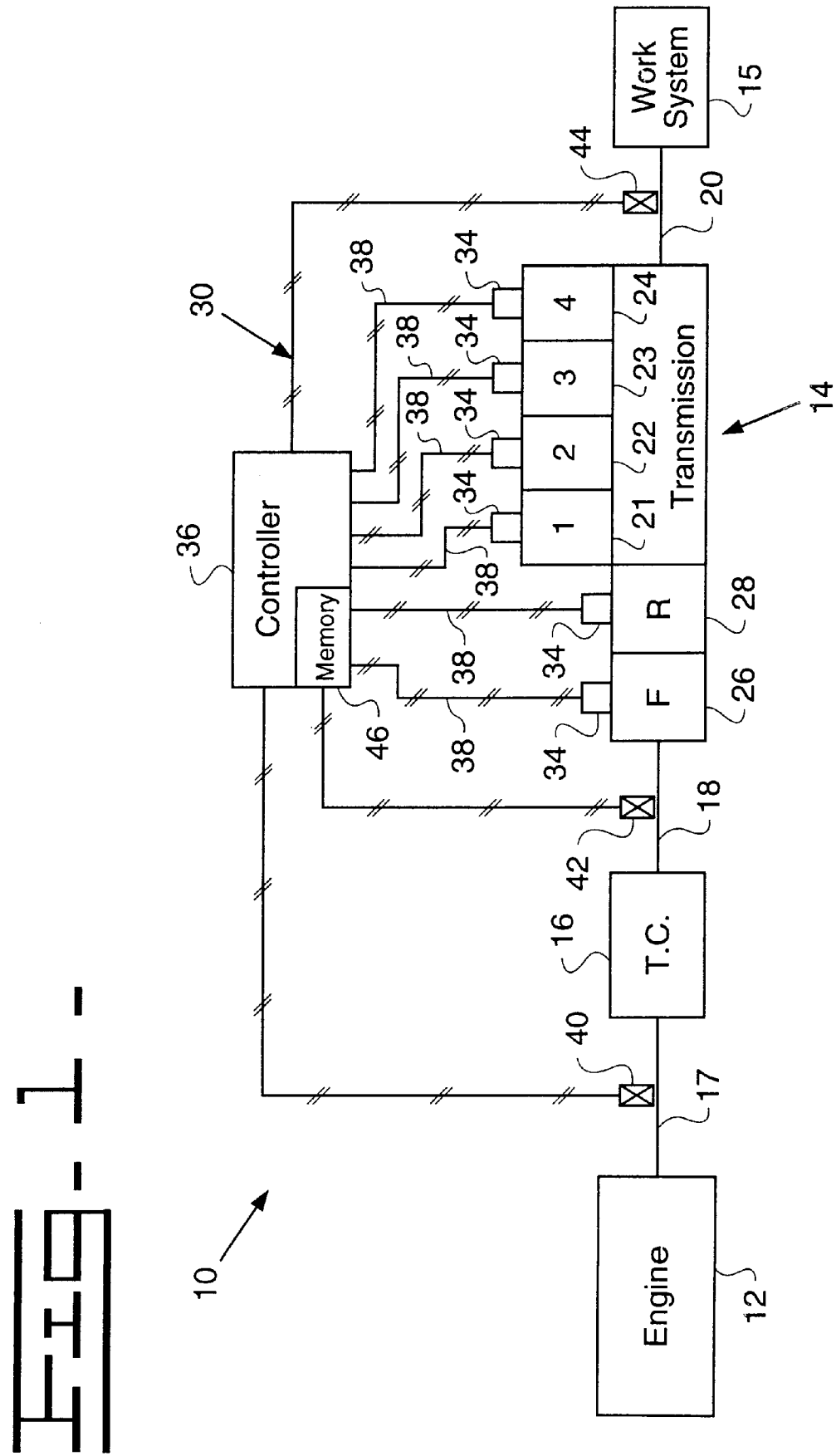

Fig-2

Adjustment Values

| Load Level | Shift | T.C. Ratio | | | Release Delay | Speed Clutch Slip Period | Speed Clutch Modulation Pressure | Direction Clutch Slip Period | Direction Clutch Ramp Pressure | Direction Clutch Hold Pressure |
|---|---|---|---|---|---|---|---|---|---|---|
| | | Engine Speed <1200 | Engine Speed 1200-1500 | Engine Speed >1500 | | | | | | |
| No | 1–2<br>2–3<br>3–4 | All | > .96<br>> .88<br>> .75 | > 1.01<br>> .96<br>> .90 | 0 | 0 | 0 | 0 | 0 | 0 |
| Min | 1–2<br>2–3<br>3–4 | — | .88 – .96<br>.65 – .88<br>.55 – .75 | .96 – 1.01<br>.88 – .96<br>.75 – .90 | 10 ms | -10 ms | + 16 psi | -100 ms | + 8 psi | + 4 psi |
| Med | 1–2<br>2–3<br>3–4 | — | < .88<br>< .65<br>< .55 | .88 – .96<br>.65 – .88<br>.55 – .75 | 20 ms | -30 ms | + 40 psi | -170 ms | + 16 psi | + 8 psi |
| Max | 1–2<br>2–3<br>3–4 | — | — | < .88<br>< .65<br>< .55 | 20 ms | -50 ms | + 80 psi | -250 ms | + 40 psi | + 8 psi |

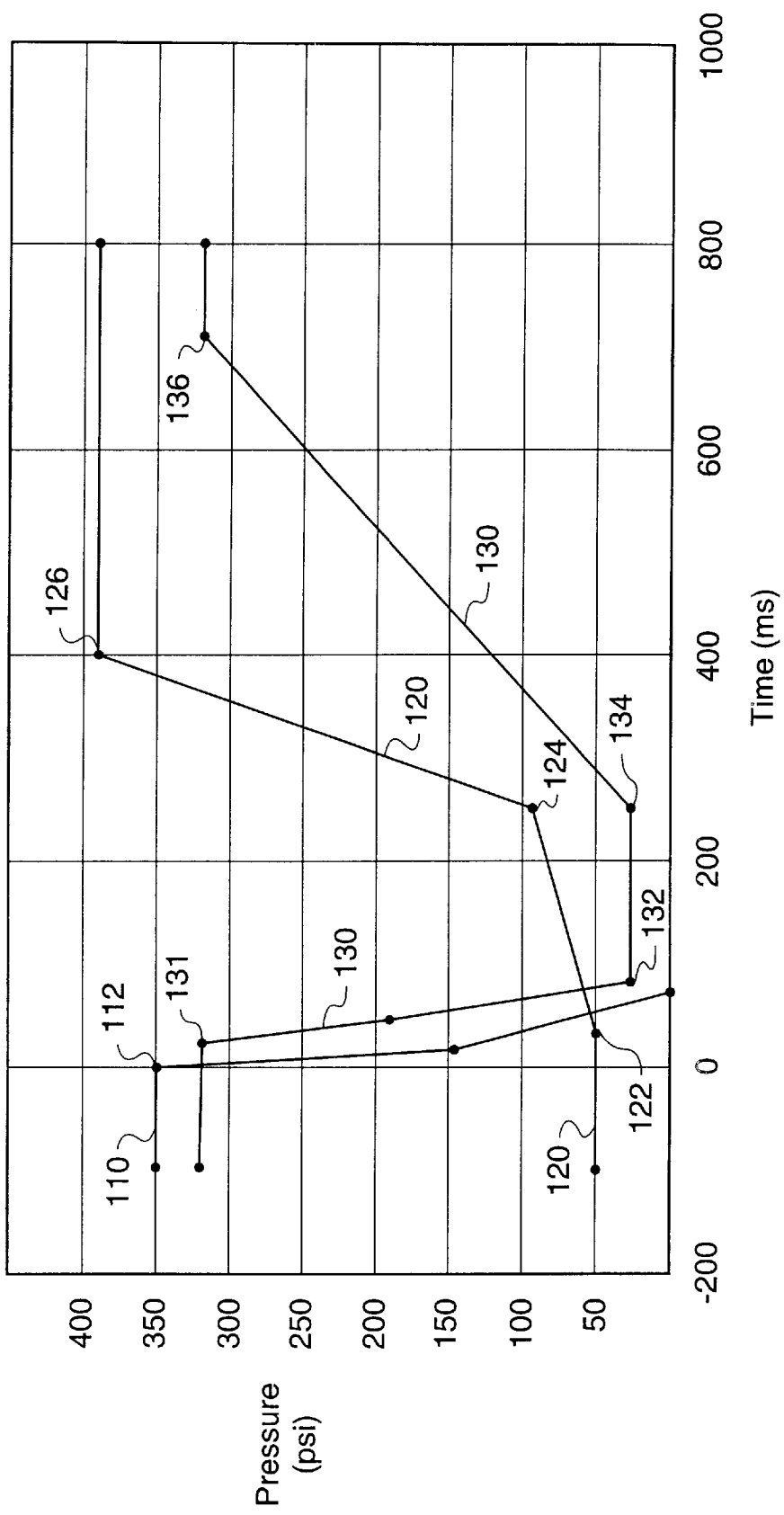

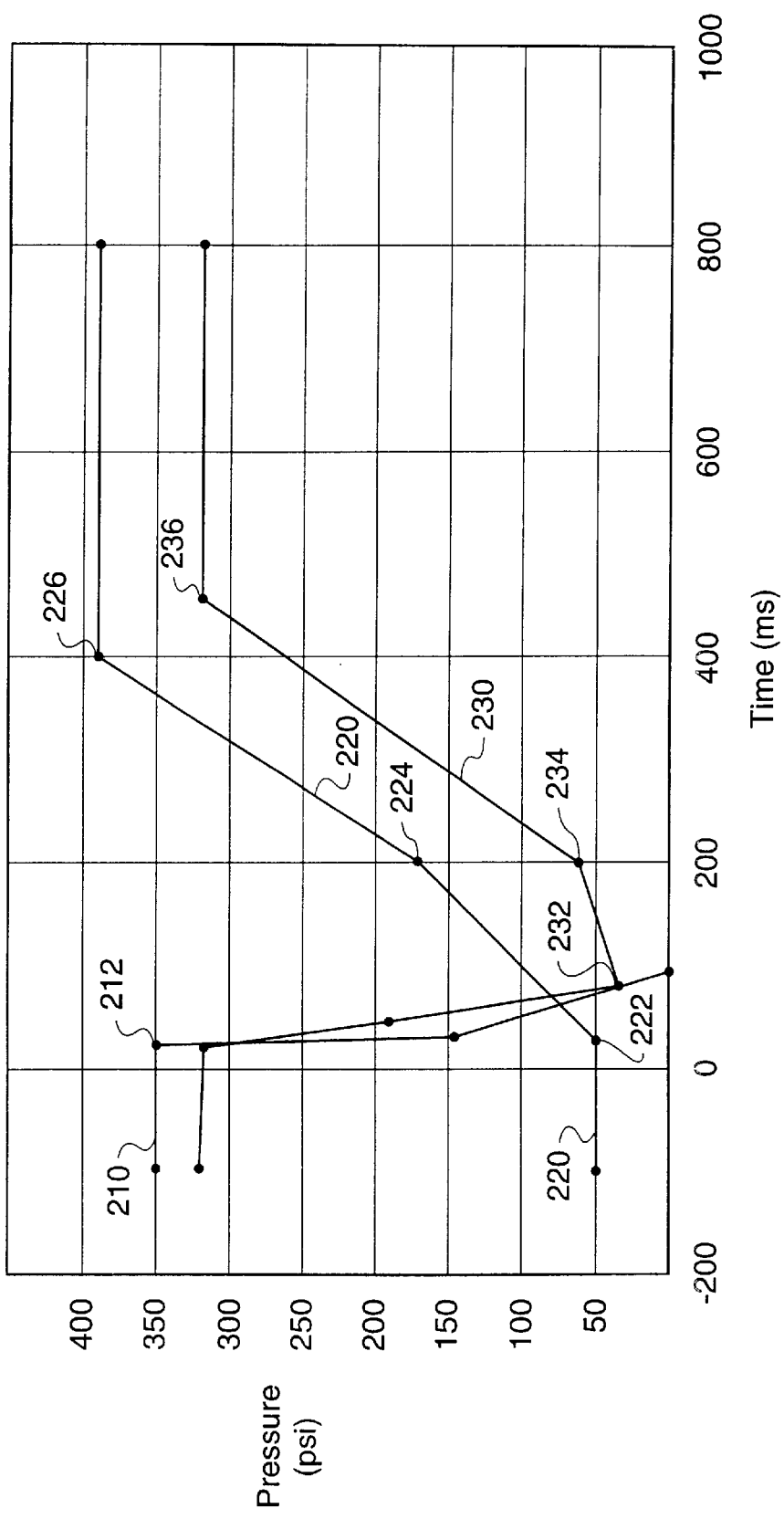

METHOD AND APPARATUS

TECHNICAL FIELD OF THE INVENTION

The present invention generally relates to a transmission, and more specifically to a method and apparatus for adaptively controlling clutches based on a torque converter ratio.

BACKGROUND OF THE INVENTION

Powershift transmissions are used in a variety of work machines where it is desirable to shift gears without interrupting the torque flow through the transmission. To this end, transmissions generally have a clutch overlap period whereby both an first speed clutch and a second speed clutch are engaged at the same time. If this overlap period is too short, then there will be a significant torque interruption to an output shaft prior to the engagement of the on-coming clutch. If the overlap period is too long, then the shift will expose the transmission to stresses which can potentially reduce the life of various transmission components. Additionally, transmissions may also have a directional clutch which bears most of the load during a shift between the first speed clutch and the second speed clutch. Therefore, it is also important to control the rate and timing of the engagement of the directional clutch with respect to the speed clutches to ensure that the load is properly carried by the directional clutch during the shift.

A single timing of the disengagement of the first speed clutch, engagement of the second speed clutch, and the disengagement and reengagement of a directional clutch is not satisfactory for all load conditions. In particular, under high load conditions, it is desirable to increase the overlap period between the first speed clutch and the second speed clutch, increase the rate at which the second speed clutch is engaged, and increase the rate at which the directional clutch is reengaged to effectively complete the gear shift. On the other hand, under light load conditions, it is desirable to decrease the overlap period between the first speed clutch and the second speed clutch, and reduce the rate at which the directional clutch is engaged to effectively complete the shift. Moreover, the pressure used to hold and engage the speed clutches and directional clutches may also be varied to improve the shift. Under high load conditions, it is desirable to increase the engagement pressures of the second speed clutch and directional clutch whereas under low load conditions, it is desirable to decrease the engagement pressures of the second speed clutch and directional clutch.

What is needed therefore is a method and apparatus for adaptively engaging speed and directional clutches based on transmission load.

DISCLOSURE OF THE INVENTION

In accordance with a first embodiment of the present invention, there is provided a drive line assembly for a work machine. The drive line assembly includes an engine driving an engine output shaft and an engine speed sensor which generates engine speed signals indicative of a speed of the engine output shaft. The drive line assembly further includes a torque converter driven by the output shaft which drives a transmission input shaft and a transmission speed sensor which generates transmission speed signals indicative of a speed of the transmission input shaft. The drive line assembly yet further includes a transmission driven by the transmission input shaft and having a first speed clutch, a second speed clutch, and a directional clutch, and a controller. The controller is operable to determine a torque converter ratio from the engine speed signal and the transmission speed signal and determine an engine load based on the torque converter ratio. The controller is further operable to control engagement of the first speed clutch, the second speed clutch and the directional clutch based on the engine load.

In accordance with a second embodiment of the present invention, there is provided a method controlling a drive line assembly. The drive line assembly includes (i) an engine driving an engine output shaft, (ii) an engine speed sensor which generates engine speed signals indicative of a speed of the engine output shaft, (iii) a torque converter driven by the output shaft which drives a transmission input shaft, (iv) a transmission speed sensor which generates transmission speed signals indicative of a speed of the transmission input shaft, (v) a transmission driven by the transmission input shaft and having a first speed clutch, a second speed clutch, and a directional clutch, and (vi) a controller. The method includes the steps of determining a torque converter ratio from the engine speed signal and the transmission speed signal with the controller and determining an engine load based on the torque converter ratio with the controller. The method further includes the step of controlling engagement of the first speed clutch, disengagement of the second speed clutch and disengagement and reengagement of the directional clutch based on the engine load with the controller.

BRIEF DESCRIPTION OF THE DRAWINGS

FIG. 1 is a schematic view of a transmission assembly which incorporates the features of the present invention therein;

FIG. 2 is a table of adjustment values for different torque converter ratios;

FIG. 3 is a graph of the command pressures for the first speed clutch, second speed clutch and directional clutch at a no load level; and FIG. 4 is a graph similar to FIG. 3, but showing adjusted command pressures at a maximum load level.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a drive train 10 which incorporates the features of the present invention therein. The drive train 10 includes an internal combustion engine 12, a multi-speed transmission 14, a work system 15, and a fluidic torque converter 16. The work system 15 may include drive wheels (not shown), differentials (not shown), axles (not shown) or other mechanisms used to propel a work machine (not shown). In particular, the input shaft 18 of the transmission 14 is driven by the engine 12 via an engine drive shaft 17 and the torque converter 16. The transmission input shaft 18 drives the transmission 14 which in turn drives a transmission output shaft 20. The transmission output shaft 20 in turn drives the work system 15 which propels the work machine.

The transmission 14 includes a number of gear ratios which can be selectively engaged or disengaged from the transmission output shaft 20 during operation of the drive train 10. The transmission 14 includes a number of speed clutches 21, 22, 23, 24 which are either engaged or disengaged to select the gear ratio. In addition, the transmission includes a forward directional clutch 26 and a reverse directional clutch 28. When the forward directional clutch 26 is engaged, rotation of the shaft 20 propels the work machine in a forward direction, whereas when the reverse directional clutch 28 is engaged, rotation of the shaft 20 propels the work machine in a reverse direction.

The drive train 10 further includes a control apparatus 30. The control apparatus 30 includes a number of actuators 34. Each actuator 34 is operable to selectively engage or disengage one of clutches 21, 22, 23, 24, 26 or 28 of the transmission 14 in response to a control signal received via a respective signal line 38. In particular, each actuator 34 controls the pressure of fluid supplied to a respective one of the clutches 21, 22, 23, 24, 26, or 28 of the transmission 12. Controlling the fluid pressure supplied to a respective clutch allows precise control on the timing and rate at which the clutches 21, 22, 23, 24, 26, 28 are engaged and disengaged.

The control apparatus 30 further includes a controller 36 which receives operator inputs and generates shift signals which are directed to the actuators 34 via the signal lines 38. In particular, to effect a shift, the controller 36 generates control signals via the signal lines 38 which causes the respective actuators 34 to disengage a first speed clutch 21, 22, 23, 24 and engage a second speed clutch 21, 22, 23, 24 while disengaging and reengaging a directional clutch 26 or 28. Note, that for unloaded and lightly loaded downshifts, the directional clutch 26, 28 may not be disengaged even thought its pressure is reduced.

The controller 36 also receives various other input signals representative of the work machine system parameters, including an engine speed signal from an engine speed sensor 40, a transmission input speed signal from a transmission input speed sensor 42, and a transmission output speed signal from a transmission output speed sensor 44. The sensors 40, 42, 44 are conventional electrical transducers typically of the magnetic speed pickup type.

Internally, the controller 36 comprises a number of conventional devices including a microprocessor (not shown), a timer (not shown) input/output devices (not shown) and a memory device 46. Stored in the memory device 46 are torque converter ratios and associated clutch adjustment values described in greater detail below.

Referring now to FIG. 2, there is shown a table of adjustment values used to control the transmission 12 during a shift. The controller 36 must first determine which gear ratio shift is being commanded. Adjustment values are available for upshifts from a 1–2 upshift from the first gear ratio (controlled by clutch 21) to a second gear ratio (controlled by the clutch 22), a 2–3 upshift from the second gear ratio to a third gear ratio (controlled by clutch 23), and 3–4 upshift from the third gear ratio to fourth gear ratio (controlled by clutch 24). In addition, the shift adjustment values are also used for downshifts between these same gear ratios, i.e. a 4–3 downshift, a 3–2 downshift, and a 2–1 downshift.

The controller 36 must then determine which of the four load conditions the transmission 14 is operating under. The controller 36 calculates a torque converter ratio from the transmission input speed signal generated from the transmission input speed sensor 42 and the engine speed signal generated from the engine speed sensor 40. In particular, the torque converter ratio in the ratio of the speed of the transmission input shaft 18 to the speed of the engine output shaft 17. The torque converter ratio has the advantage of indicating how much load is being transmitted by the engine 12 to the transmission 14. Other methods of calculating load, such as measuring the fuel flow or mass flow through the engine 12, measure a total load on the engine 12. If the engine 12 is also powering other devices, such as hydraulic pumps, then the total load on the engine 12 is greater than the load transmitted to the transmission 14.

The six parameters varied by the controller 36 as a function of load are a release delay, a speed clutch slip period, a speed clutch modulation pressure, a direction clutch slip period, a direction clutch ramp pressure, and a direction clutch hold pressure. The release delay is the delay in disengaging the first speed clutch 21, 22, 23, or 24. Increasing the release delay increases the overlap period where both the first speed clutch 21, 22, 23, or 24 and the second speed clutch 21, 22, 23, or 24 are engaged.

The speed clutch slip period is the period of time which the controller 36 modulates the pressure supplied to the second speed clutch 21, 22, 23, 24 to controllably slip the second speed clutch 21, 22, 23 or 24 prior to full engagement of the second speed clutch 21, 22, 23, 24. Decreasing the speed clutch slip period reduces torque interruptions when operating at higher load levels.

The speed clutch modulation pressure is the maximum pressure supplied to the second speed clutch 21, 22, 23, or 24 during the speed clutch slip period. Increasing the speed clutch modulation pressure reduces excessive slippage and torque interruption during the speed clutch slip period.

The direction clutch slip period is the period of time which the controller 36 modulates the pressure supplied to the directional clutch to controllably slip the directional clutch 26 or 28 prior to full engagement of the directional clutch 26 or 28. Note, that because the directional clutch 26 or 28 is the main load bearing clutch, the directional clutch slip period does not begin until after the end of the speed clutch slip period. Decreasing the directional clutch slip period reduces torque interruptions at higher load levels as the directional clutch 26 or 28 is reengaged more rapidly.

The directional clutch ramp pressure is the pressure supplied to the directional clutch 26 or 28 at the beginning of the directional clutch slip period. Note, that the directional clutch may not always slip during the directional clutch slip period. During unloaded and lightly loaded downshifts, the directional clutch is not likely to disengage. Increasing the directional clutch ramp pressure reduces excessive slippage and torque interruption during the directional clutch slip period when operating at higher load levels.

The directional clutch hold pressure is the minimum pressure supplied to the directional clutch 26 or 28. Increasing the directional clutch hold pressure reduces directional clutch from becoming fully disengaged during the upshift or downshift.

If the torque converter ratio is greater than a first threshold (1.01 for a 1–2 shift, 0.96 for a 2–3 shift, or 0.90 for a 3–4 shift), then the transmission is operating under at a no load level and no adjustment is made to the operation of the transmission 14. Therefore, the no load level is a baseline condition for each shift.

If the torque converter ratio is less than the first threshold (1.01 for a 1–2 shift, 0.96 for a 2–3 shift, or 0.90 for a 3–4 shift), but greater than a second threshold (0.96 for a 1–2 shift, 0.88 for a 2–3 shift, or 0.75 for a 3–4 shift), then the transmission 14 is operating at a minimum load level, and a small adjustment is made to each of the shift parameters during an upshift. The release delay is increased by 10 ms, the speed clutch slip period is decreased by 10 ms, the speed clutch modulation pressure is increased by 16 psi, the direction clutch slip period in decreased by 100 ms, the direction clutch ramp pressure is increased by 8 psi, and the direction clutch hold pressure is increased by 4 psi.

If the torque converter ratio is less than the second threshold (0.96 for a 1–2 shift, 0.88 for a 2–3 shift, or 0.75 for a 3–4 shift), but greater than a third threshold (0.88 for a 1–2 shift, 0.65 for a 2–3 shift, or 0.55 for a 3–4 shift), then the transmission 14 is operating at a medium load level, and a intermediate adjustment is made to each of the shift parameters during an upshift. The release delay is increased by 20 ms, the speed clutch slip period is decreased by 30 ms, the speed clutch modulation pressure is increased by 40 psi, the direction clutch slip period in decreased by 170 ms, the direction clutch ramp pressure is increased by 16 psi, and the direction clutch hold pressure is increased by 8 psi.

If the torque converter ratio is less than a third second threshold (0.88 for a 1–2 shift, 0.65 for a 2–3 shift, or 0.55 for a 3–4 shift), then the transmission 14 is operating at a maximum load level, and a large adjustment is made to each of the shift parameters during an upshift. The release delay is increased by 20 ms, the speed clutch slip period is decreased by 50 ms, the speed clutch modulation pressure is increased by 80 psi, the direction clutch slip period in decreased by 250 ms, the direction clutch ramp pressure is increased by 40 psi, and the direction clutch hold pressure is increased by 8 psi.

In addition, the load may be adjusted according to the output speed of the engine 12. If the engine 12 is operating below a low threshold speed, approximately 1200 RPM for the exemplary configuration, every shift is treated as a no load level operating condition regardless of the torque converter ratio. The low threshold is an engine speed which indicates that the engine is operating near the lower end of it's torque potential at a given torque converter ratio. If the engine 12 is operating between the low threshold speed and a high threshold speed, 1500 RPM in the exemplary configuration, then the load level of the shift is decremented by one level. The high threshold is an engine speed which indicates that the engine is operating near the upper end of it's torque potential at a given torque converter ratio. In particular, maximum load levels shifts are adjusted the medium load level, medium load level shifts are adjusted to the minimum load level, and minimum load level shifts are adjusted to the no load level.

An additional adjustment can be made in the case of 2–1 downshifts where the speed clutch slip period can be made more aggressive for better performance. In particular, the baseline speed clutch slip period is increased by 100 ms. The load based speed clutch slip period adjustment made during the 2–1 downshift are then increased from the speed clutch slip period adjustment values shown in FIG. 2.

Referring now to FIG. 3, there is shown a first speed clutch command 110, a second speed clutch command 120, and a directional clutch command 130 generated while operating at the no load level or baseline level. The first speed clutch command 110 controls the disengagement of the first speed clutch 21, 22, 23, or 24 to complete the upshift or downshift. The first speed clutch command 110 begins to disengage the first speed clutch 21, 22, 23, or 24 at the point 112 at which time the pressure supplied to the first speed clutch 21, 22, 23, or 24 rapidly decreases from about 350 psi to 0 psi.

The second speed clutch command 120 controls the engagement of the second speed clutch 21, 22, 23, 24. The second speed clutch command 120 holds the pressure supplied to the second speed clutch to a hold level of about 20 psi for a stationary clutch or 42 psi for a rotating clutch, until reaching a point 122. The second speed clutch command 120 is modulated during the speed clutch slip period, between the point 122 and a point 124, to control the slip of the second speed clutch 21, 22, 23, or 24. Note, that there is little to no overlap period where the first speed clutch command 110 supplies pressure to the first speed clutch 21, 22, 23, 24 and the second speed clutch command 120 supplies pressure to the second speed clutch 21, 22, 23, 24. The pressure at the point 124 is the maximum modulation pressure for the second speed clutch command 120 during the speed clutch slip period. After the speed clutch slip period, the second speed clutch command 120 is rapidly increased to the maximum pressure at the point 126 to fully engage the second speed clutch 21, 22, 23, 24.

The directional clutch command 130 controls the disengagement and reengagement of the directional clutch 26 or 28. The directional clutch command 130 decreases pressure supplied to the directional clutch 26 or 28 from full pressure of about 320 psi at a point 131 to a hold pressure of about 25 psi at the point 132. The hold pressure is a low pressure which reduces the directional clutch 26 or 28 from becoming fully disengaged during a shift. It is desirable to keep the directional clutch 26 or 28 partially engaged because the directional clutch is the main load bearing clutch of the transmission 14. Between the point 132 and a point 134, the directional clutch command 120 is ramped up prior to the directional clutch slip period between the point 134 and a point 136. The directional clutch command 130 is modulated to control slip of the directional clutch 26 or 28 during the directional clutch slip period, between the point 134 and the point 136, where the maximum pressure of about 320 psi is reached and the directional clutch 26 or 28 is fully engaged.

Referring now to FIG. 4, there is shown an adjusted first speed clutch command 210, an adjusted second speed clutch command 220, and an adjusted directional clutch command 230 generated while operating at the maximum load level. As described above, the maximum load level corresponds to a torque converter ratio less than 0.88 for a 1–2 shift, less than 0.65 for a 2–3 shift and less than 0.55 for a 3–4 shift. The adjusted first speed clutch command 210 begins to disengage the first speed clutch 21, 22, 23, or 24 at the point 212 at which time the pressure supplied to the first speed clutch 21, 22, 23, or 24 rapidly decreases from about 350 psi to 0 psi. Note that the adjusted first speed clutch command 220 incorporates the 20 ms speed clutch release delay time of FIG. 2.

The adjusted second speed clutch command 220 holds the pressure supplied to the second speed clutch to a hold level of about 50 psi, until reaching a point 222. The adjusted second speed clutch command 220 is modulated during the speed clutch slip period, between the point 222 and a point 224, to control the slip of the second speed clutch 21, 22, 23, or 24. Note, that the there is a significant overlap period where the adjusted first speed clutch command 210 supplies pressure to the first speed clutch 21, 22, 23, 24 and the adjusted second speed clutch command 220 supplies pressure to the second speed clutch 21, 22, 23, 24. This overlap period is due to the 20 ms release delay time in the adjusted first speed clutch command 210. In addition, the speed clutch slip period between the point 222 and the point 224 has been decreased by the 50 ms speed clutch slip period adjustment of FIG. 2. The increase in overlap period and decrease in the speed clutch slip period reduce torque interruptions during the shift at the maximum load level. The adjusted second speed clutch command 220 has a maximum pressure at the point 224 which has been adjusted up by the 80 psi speed clutch modulation pressure adjustment of FIG. 2. Increasing the maximum commanded pressure during the speed clutch slip period also reduces torque interruptions during the speed clutch slip period. After the speed clutch slip period, the adjusted second speed clutch command 220 is rapidly increased to the maximum pressure at the point 226 to fully engage the second speed clutch 21, 22, 23, 24.

The adjusted directional clutch command 230 decreases pressure supplied to the directional clutch 26 or 28 from full pressure of about 320 psi at a point 231 to a hold pressure of about 33 psi at the point 232. The hold pressure is increased by the 8 psi direction clutch hold level adjustment of FIG. 2 to ensure that the directional clutch 26 or 28 does not fully disengage during the shift at the maximum load level. Between the point 232 and a point 234, the adjusted directional clutch command 230 is ramped up prior to the directional clutch slip period between the point 234 and a point 236. The pressure at the point 234 has been increased by the 40 psi directional clutch ramp pressure adjustment of FIG. 2. Increasing the adjusted directional clutch command 230 increases the pressure within the directional clutch 26, 28 prior to the directional clutch slip period which reduces torque interruptions during the directional clutch slip period. The adjusted directional clutch command 230 is modulated to control slip of the directional clutch 26 or 28 between the point 234 and the point 236 at which the maximum pressure of about 320 psi is reached. Note the duration of the directional clutch slip period, between the points 234 and 236, has been decreased by the 250 ms directional clutch slip period adjustment of FIG. 2 which also reduces torque interruptions when operating at the maximum load level.

It should be appreciated that the adjusted clutch commands 210, 220, and 230 could be adjusted with different values shown in FIG. 2 depending the torque converter ratio. It should further be appreciated that the load level could be corrected for engine speed as described above.

Industrial Applicability

In operation, the controller 36 first determines which shift is being performed and the current torque converter ratio to determine a load level, as shown in FIG. 2. This load level may then be adjusted if the engine is operating at less than the high idle speed. From the load level, the controller 36 retrieves six adjustment values associated with the determined load level. These six adjustment values are then used to modify the no load level or baseline shift shown in FIG. 3.

For the maximum load level, the release delay time causes a 20 ms delay in the adjusted first direction clutch command 210 of FIG. 4 as compared to the first direction clutch command 120 of FIG. 3. The adjusted second speed clutch command 220 produces a speed clutch slip period between the point 222 and the point 224 of FIG. 4 which is 50 ms shorter than the speed clutch slip period between the point 122 and 124 of FIG. 3. The adjusted second speed clutch command 220 also produces a maximum modulation pressure at the point 224 of FIG. 4 which is 80 psi larger than the maximum modulation pressure at the point 124 of FIG. 3. The adjusted directional clutch command 230 produces a hold pressure at the point 232 of FIG. 4 which is 8 psi larger than the hold pressure at the point 132 of FIG. 3. The adjusted directional clutch command 230 also produces a ramp pressure at the point 234 of FIG. 4 which is 40 psi larger than the ramp pressure at the point 134 of FIG. 3. The adjusted directional clutch command 230 also decreases the directional clutch slip period between the point 234 and the point 236 of FIG. 4 by 250 ms when compared to the directional clutch slip period between the point 134 and the point 136 of FIG. 3.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A drive line assembly for a work machine comprising:
   an engine driving an engine output shaft;
   an engine speed sensor which generates engine speed signals indicative of a speed of said engine output shaft;
   a torque converter driven by said output shaft which drives a transmission input shaft;
   a transmission speed sensor which generates transmission speed signals indicative of a speed of said transmission input shaft;
   a transmission driven by said transmission input shaft and having a first speed clutch, a second speed clutch, and a directional clutch; and
   a controller operable to (i) determine a torque converter ratio from said engine speed signal and said transmission speed signal (ii) determine a transmission load based on said torque converter ratio, and (iii) control engagement of said first speed clutch, disengagement of said second speed clutch, and disengagement and reengagement of said directional clutch based on said transmission load.

2. The apparatus of claim 1, wherein:
   said controller determines a release delay time corresponding to said load, and
   said controller delays a release of said first speed clutch by said release delay time.

3. The apparatus of claim 1, wherein:
   said controller determines a speed clutch slip period corresponding to said load, and
   said controller controls slip of said second speed clutch during said speed clutch slip period.

4. The apparatus of claim 3, wherein:
   said controller determines a speed clutch modulation pressure corresponding to said load, and
   said controller limits maximum pressure reached at the end of said speed clutch slip period to said speed clutch modulation pressure.

5. The apparatus of claim 1, wherein:
   said controller determines a directional clutch slip period corresponding to said load, and
   said controller controls slip of said directional clutch during said directional clutch slip period.

6. The apparatus of claim 5, wherein:
   said controller determines a directional clutch ramp pressure corresponding to said load, and
   said controller controls limits pressure reached at the beginning of said directional clutch slip period to said directional clutch modulation pressure.

7. The apparatus of claim 6, wherein:
   said controller determines a directional clutch hold pressure corresponding to said load, and
   said controller limits minimum pressure supplied to said directional clutch.

8. The apparatus of claim 1, wherein said engine load is divided into a number of distinct load ranges levels on torque converter ratio.

9. The apparatus of claim 8, wherein said controller modifies said load level based on said engine speed signal.

10. A method for controlling a drive line assembly having (i) an engine driving an engine output shaft, (ii) an engine speed sensor which generates engine speed signals indicative of a speed of the engine output shaft, (iii) a torque converter driven by the output shaft which drives a transmission input shaft, (iv) a transmission speed sensor which generates transmission speed signals indicative of a speed of the transmission input shaft, (v) a transmission driven by the transmission input shaft and having a first speed clutch, a second speed clutch, and a directional clutch, and (vi) a controller, comprising the steps of:

determining a torque converter ratio from the engine speed signal and the transmission speed signal with the controller;

determining a transmission load based on the torque converter ratio with the controller; and controlling engagement of the first speed clutch, the second speed clutch and the directional based on the transmission load with the controller.

11. The method of claim 10, further comprising the steps of:

determining a release delay time corresponding to the load; and delaying the release of the first speed clutch by the release delay time.

12. The method of claim 10, further comprising the steps of:

determining a speed clutch slip period corresponding to the load; and controlling slip of the second speed clutch during the speed clutch slip time.

13. The method of claim 10, further comprising the steps of:

determining a speed clutch modulation pressure corresponding to the load; and limiting the maximum pressure reached at the end of the speed clutch slip period to the speed clutch modulation pressure.

14. The method of claim 10, further comprising the steps of:

determining a directional clutch slip period corresponding to the load; and controlling slip of the directional clutch during the directional clutch slip period.

15. The method of claim 4, further comprising the steps of:

determining a directional clutch ramp pressure corresponding to the load; and limiting the pressure supplied at the beginning of the directional clutch slip period to the directional clutch modulation pressure.

16. The method of claim 15, further comprising the steps of:

determining a directional clutch hold pressure corresponding to the load; and limiting the minimum pressure supplied to the directional clutch to the directional clutch minimum pressure.

17. The method of claim 10, further comprising the step of dividing the engine load into a number of distinct load levels based on torque converter ratio.

18. The method of claim 16, further comprising the step of modifying the load level based on the engine speed signal.

* * * * *

UNITED STATES PATENT AND TRADEMARK OFFICE
CERTIFICATE OF CORRECTION

PATENT NO. : 6,199,450 B1
DATED : March 13, 2001
INVENTOR(S) : Douglas A. Carlson, et al.

It is certified that error appears in the above-identified patent and that said Letters Patent is hereby corrected as shown below:

Please change the Title from "Method and Apparatus" to the following:

Method and Apparatus For Adaptively Controlling Clutches Based On A Torque Converter Ratio.

Signed and Sealed this

Twenty-eighth Day of August, 2001

*Attest:*

NICHOLAS P. GODICI
*Acting Director of the United States Patent and Trademark Office*

*Attesting Officer*